United States Patent
Werner

(10) Patent No.: US 6,298,836 B1
(45) Date of Patent: Oct. 9, 2001

(54) ARRANGEMENT FOR VENTING AN ENGINE CRANKCASE

(75) Inventor: Peter Werner, Berlin (DE)

(73) Assignee: Daimler-Chrysler A.G., Stuttgart (DE)

( * ) Notice: Subject to any disclaimer, the term of this patent is extended or adjusted under 35 U.S.C. 154(b) by 0 days.

(21) Appl. No.: 09/590,704

(22) Filed: Jun. 8, 2000

(30) Foreign Application Priority Data

Jun. 23, 1999  (DE) ................................. 199 28 727

(51) Int. Cl.$^7$ .................................................. F01M 13/02
(52) U.S. Cl. ........................................................ 123/572
(58) Field of Search ................................. 123/572, 573, 123/574, 41.86

(56) References Cited

U.S. PATENT DOCUMENTS

| | | | |
|---|---|---|---|
| 3,844,260 | * | 10/1974 | Scott, Jr. et al. ..................... 123/572 |
| 4,345,573 | * | 8/1982 | Obata .................................. 123/572 |
| 5,497,755 | | 3/1996 | Maloney . |
| 5,542,401 | * | 8/1996 | Newarski ............................. 123/572 |
| 5,927,258 | * | 7/1999 | Clauss et al. ......................... 123/573 |

FOREIGN PATENT DOCUMENTS

| | | |
|---|---|---|
| PA525 191 | 8/1960 | (DE) . |
| 1476052 | 10/1974 | (DE) . |
| 3726332 | 8/1987 | (DE) . |
| 653559 A1 | 5/1995 | (EP) . |
| 661649 | 11/1951 | (GB) . |
| 1029818 | 5/1966 | (GB) . |
| 1531080 | 11/1978 | (GB) . |
| 2118861A | 11/1983 | (GB) . |

* cited by examiner

Primary Examiner—Marguerite McMahon
(74) Attorney, Agent, or Firm—Klaus J. Bach; Kenneth H. MaClean

(57) ABSTRACT

In a substantially throttle-free internal combustion engine, an air extraction arrangement for the interior of the engine crankcase including: an air-extraction line extending from the engine and opening into an air intake line to the combustion chamber of the engine, and a negative pressure generating device in the engine's air intake line. Further, an air line attached to the air intake line upstream of the negative-pressure-producing device extends to the crankcase to admit fresh air to the crankcase interior.

6 Claims, 1 Drawing Sheet

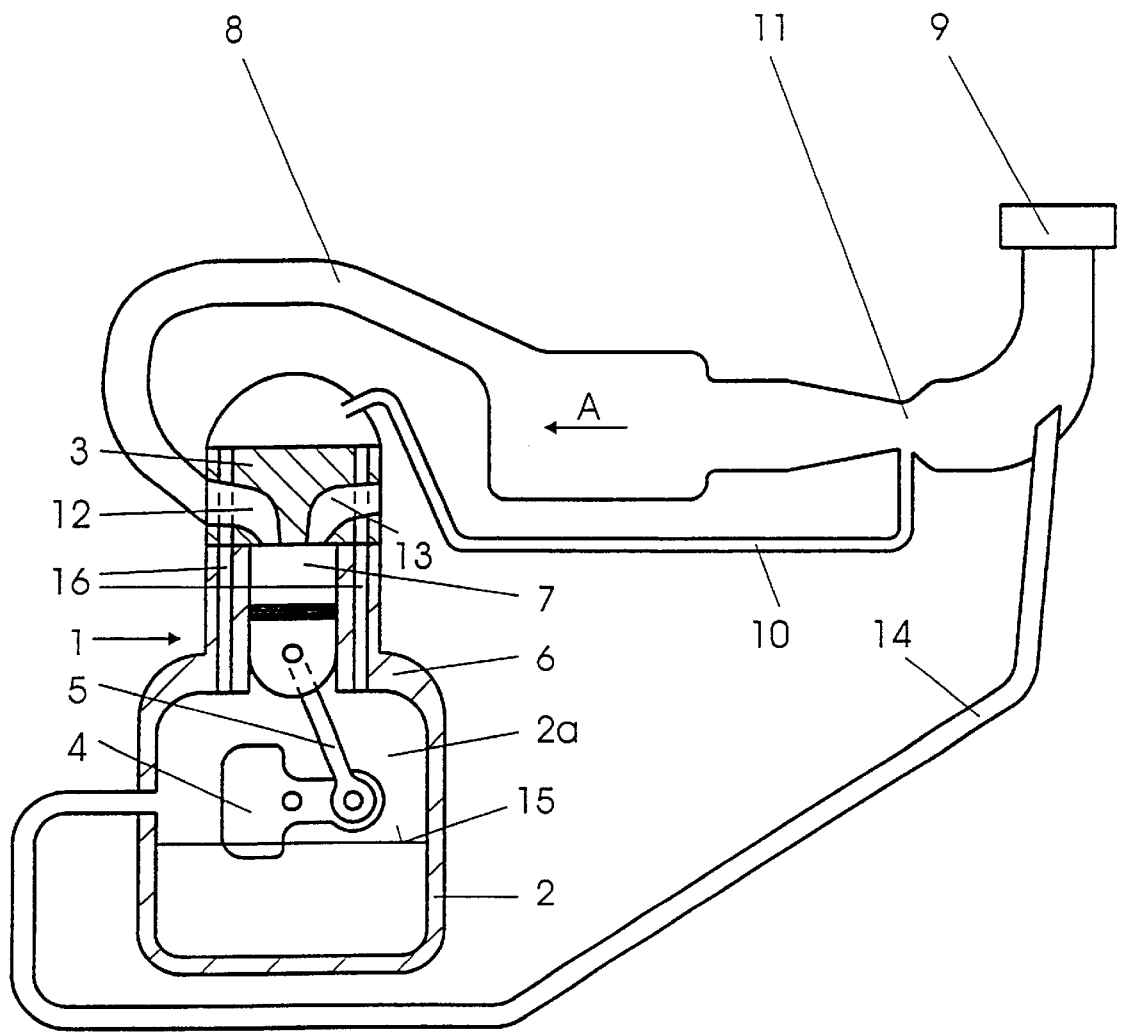

ARRANGEMENT FOR VENTING AN ENGINE CRANKCASE

BACKGROUND OF THE INVENTION

1. Field of the Invention

This invention concerns an arrangement to extract air from a crankcase of an internal combustion engine of the substantially throttless type.

2. Description of Related Art

There are various known arrangements for extracting air from engine crankcases. German Utility Model 18 31 027 describes, for example, such an arrangement having an air conduit extending from the crankcase to an intake fitting formed to the engine air filter assembly. This arrangement achieves a relatively high negative pressure in the conduit relative to the crankcase which results in desired air extraction therefrom.

Likewise, German DE-B 14 76 052 describes an air extracting arrangement for a crankcase of an internal combustion engine having a carburetor. A filter cap allows air to enter the crankcase and an extraction line withdraws air therefrom to the narrowest position of the carburetor's venturi. A control mechanism is used to regulate air flow.

Further, in the extracting arrangement for air disclosed in German DE 37 26 332 C1, a crankcase extraction line is connected to a throttle housing and specifically to a trough-like depression formed therein. This construction allows condensation which may form particularly during idling of the engine to collect in this depression rather than on the throttle itself.

In the carburetor or manifold-injection fitted type of internal combustion engines described above, a difference in pressure between the throttle and crankcase regions is utilised in order to purge crankcase air. Typically, an outlet fitting on the cylinder head valve cover is utilised as an exit for air withdrawn from the engine. The extracted air includes so-called blow-by gases (about the pistons and piston rings). It is desirable to remove these blow-by gases because they are abrasive and promote engine wear of pistons and cylinders.

SUMMARY OF THE INVENTION

In a substantially throttle-free internal combustion engines, e.g. a direct-injection spark-ignition internal combustion engine, the aforedescribed arrangements for extracting air from the crankcase are not possible because the differential pressure which is sued cannot be generated without a throttle.

The object of the present invention is to provide an arrangement for extracting air and blow-by gases from the crankcase of a substantially throttless internal combustion engine, in particular a direct-injection spark-ignition internal combustion engine, during all operating states of the engine.

The arrangement according to this invention produces a depressed air pressure in the engine's air intake line which is used to reliably extract crankcase air and blowby gas from the engine crankcase.

The aforementioned negative-pressure producing arrangement may be in the form of a venturi nozzle section of the engine air intake system. Such a venturi nozzle has the advantage that it does not influence the quantity of air to the internal combustion engine and as a result of this the engine maintains its full power capacity.

Further advantageous configurations and developments of the invention can be understood from a reading of the following detailed description of and embodiment of the invention, reference being to the drawing of the embodiment.

BRIEF DESCRIPTION OF THE DRAWING

The single FIGURE is a somewhat schematic illustration of an arrangement according to the invention for extracting air from the engine crankcase.

DESCRIPTION OF A PREFERRED EMBODIMENT

A substantially throttless or throttle-free internal combustion engine 1 is shown in the drawing. The engine is a direct-injection, spark-ignition type and has a crankcase 2 and a cylinder head 3. A crankshaft 4 rotates in a known manner in a crank space 2a of the crankcase 2. A connecting rod 5 connects between a piston 6 and the crankshaft 4 in a known manner. In the present case, a plurality of connection rods 5 with a corresponding number of pistons 6 are provided on the crankshaft 4, although, for the sake of simplicity, just one connecting rod 5 with an associated piston 6 is illustrated. The piston 6 reciprocates in a cylinder 7 of the internal combustion engine 1. Alternately to the direct-injection, spark-ignition type of operation, the engine 1 may also operate by the diesel principle.

An air intake line 8 leads to the cylinder head 3 and an air filter 9 is arranged to filter air flowing to the engine through line 8 in flow direction A. In order to extract air from the crankcase space 2 particularly during wide-open-throttle or the full-load operational mode, an air-extracting line 10 extends from the cylinder head 3 to the interior of the intake line 8. Specifically, the line 10 opens to the interior of line 10 at a venturi nozzle section 11 of the line 8. As air flows through the line 8, the venturi nozzle section 11 produces a negative pressure at this location and thus this may be referred to as a negative-pressure-producing device 11. Other known negative-pressure-producing devices 11 are conceivable for the purpose of achieving the desired effect. The intake line 8 continues on from the venturi section 11 to connect with one or more inlet channels or passages 12 in the cylinder head 3. The cylinder head 3 also has one or more corresponding outlet channels or passages 13 for discharging exhaust gas.

An air-admitting line 14 connects to the intake line 8 upstream of the negative-pressure-producing device 11 and opens to the crankcase 2. In order to inhibit production of oil foam, the air-admitting line 14 opens into the crank space 2a above the surface of the oil level 15. Alternatively, it would also be conceivable for the air-admitting line 14 to be led in beneath the oil level 15.

During a partial-load mode of operation of the engine 1, fresh air flows from the intake line 8 into the air-admitting line 14 and passes into the crank space 2a. The flow of fresh air takes up blow-by gases which are present in the crank space 2a and carries them through lines or passages 16 in the crankcase 2 and cylinder head 3 to the interior of a valve cover or the like attached to the cylinder head. Then the air and blow-by gases pass into the air-extracting line 10 and back to the engine intake passage 8. Thus, blow-by gases and oil residues are extracted from the crank space 2a by suction and carried back into the intake line 8 during all operating modes of the engine. Resultantly, they are fed to a combustion chamber formed by the piston, cylinder head 3, and cylinder 7. The above described air flow is produced by the difference in air pressure between the negative-pressure-producing device 11 in the intake line 8 and upstream of the device 11.

Because the internal combustion engine 1 is substantially throttless, an effective extraction of air from the crankcase 2 would otherwise not be possible, particularly in a partial-load operating mode. Of course, it would be possible to use a throttle, for example, for an engine brake or for exhaust-gas recirculation but this does not affect the designation "throttle-free internal combustion engine" for the purposes of this invention.

The air-extracting line 10 connected to the cylinder head 3 and the air-admitting line 14 connected to the crankcase 2 provide an arrangement for extracting air from the crankcase 2 of the internal combustion engine 1 during all operating states or modes of the internal combustion engine 1. Further, it ensures reliable extraction of the blow-by gases which reduces the contamination of the engine lubricating oil and results in an ability to utilise longer intervals between oil-changes.

I claim:

1. An arrangement for extracting air from the interior space of the crankcase of an internal combustion engine absent a throttle plate and having a cylinder head and an air intake line, said arrangement, comprising:

an air-extracting line extending from the engine to the engine intake line for withdrawing air from the engine crankcase, a negative air pressure producing device for generating unregulated negative pressure relative to the crankcase space in the air intake line leading to the engine over the entire mode of operation of the engine; and an air-admitting line connected to the intake air line upstream of the negative-pressure-producing device and connected to the crankcase to open into the crankcase space.

2. The arrangement as set forth in claim 1, where the negative-pressure-producing device (11) is in the form of a venturi nozzle.

3. The arrangement as set forth in claim 1, in which the air-admitting line (14) connects to the crankcase (2) and opens to crankcase space (2a) above the level (15) of a quantity of engine oil.

4. The arrangement as set forth in claim 3, where a passage (16) communicates the crankcase space (2a) and the connection of the air-extracting line (10) with the cylinder head (3) to route air from the crankcase space (2a) to the air-extracting line (10).

5. The arrangement as set forth in claim 2, where the air-extracting line (10) connects to and opens into the intake line (8) in the region of the venturi nozzle (11).

6. The arrangement as set forth in claim 1, where the air-admitting line extends a spaced apart distance from the intake line to the crankcase.

* * * * *